United States Patent [19]
Tunison

[11] 3,839,966
[45] Oct. 8, 1974

[54] SAFETY MEANS FOR TROLLEY SWITCHES

[75] Inventor: Paul Martin Tunison, Union City, Calif.

[73] Assignee: The Cincinnati Butchers' Supply Company, Cincinnati, Ohio

[22] Filed: Aug. 29, 1972

[21] Appl. No.: 284,669

[52] U.S. Cl. ............................ 104/100, 104/242
[51] Int. Cl. .................................... E01b 25/20
[58] Field of Search .......... 104/100, 242, 130, 110; 105/150

[56] References Cited
UNITED STATES PATENTS
3,006,287  10/1961  Schmidt .......................... 104/100
3,252,427  5/1966  Bailey .............................. 105/150

Primary Examiner—Robert G. Sheridan
Assistant Examiner—George F. Abraham
Attorney, Agent, or Firm—J. Warren Kinney, Jr.

[57] ABSTRACT

The trolley switch unit, generally incorporated in overhead track systems designed to carry heavy objects such as suspended meat animal carcasses, is equipped with safety means in the form of guard rails arranged to prevent hazardous dropping of the trolley and its load in the event of trolley derailment at or near the switch unit.

10 Claims, 5 Drawing Figures

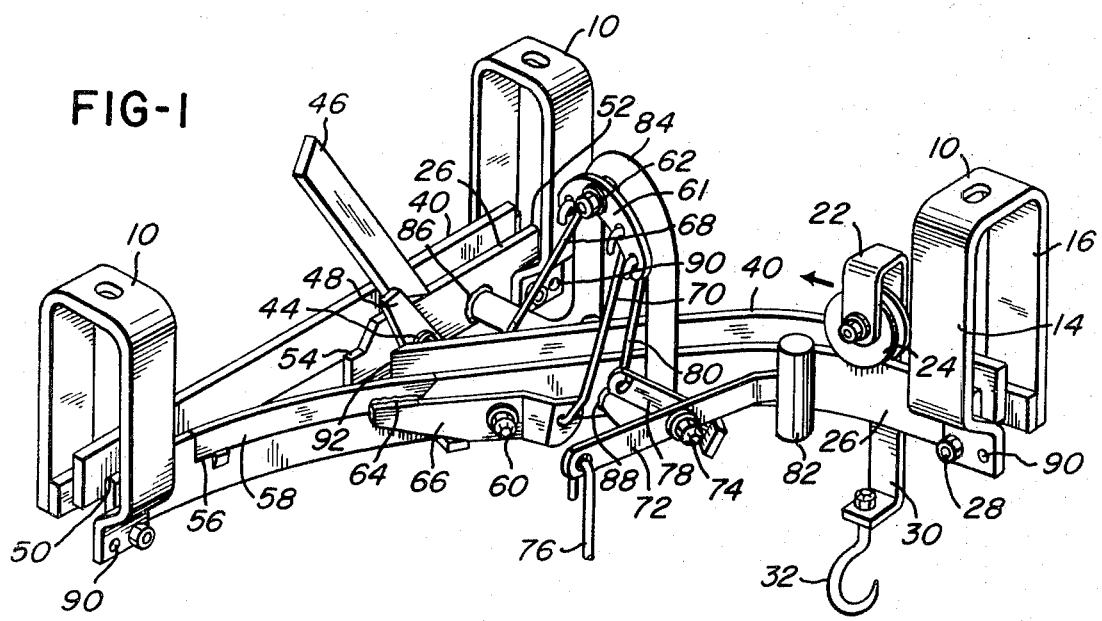
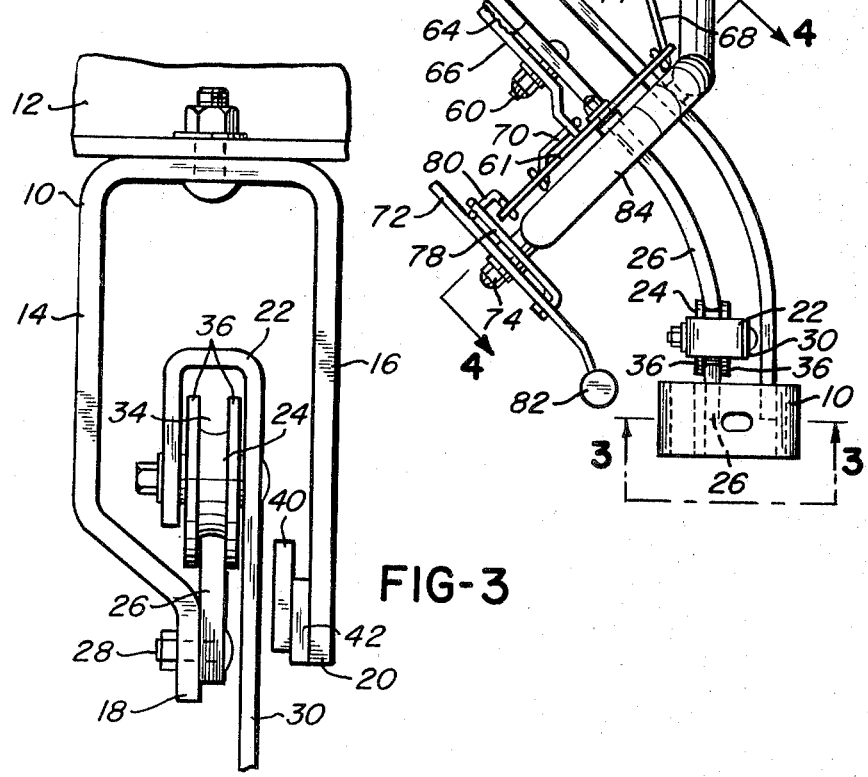

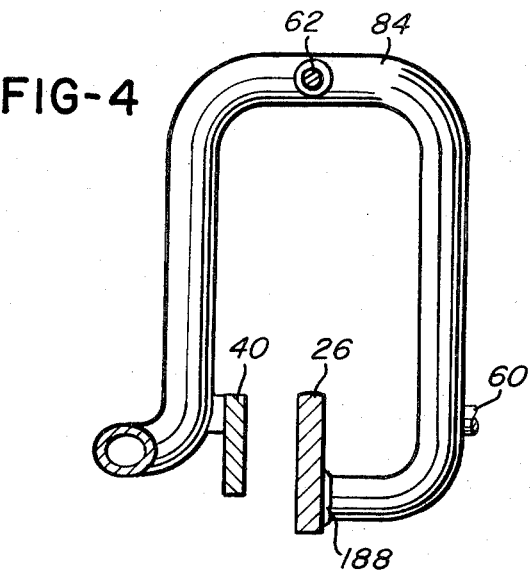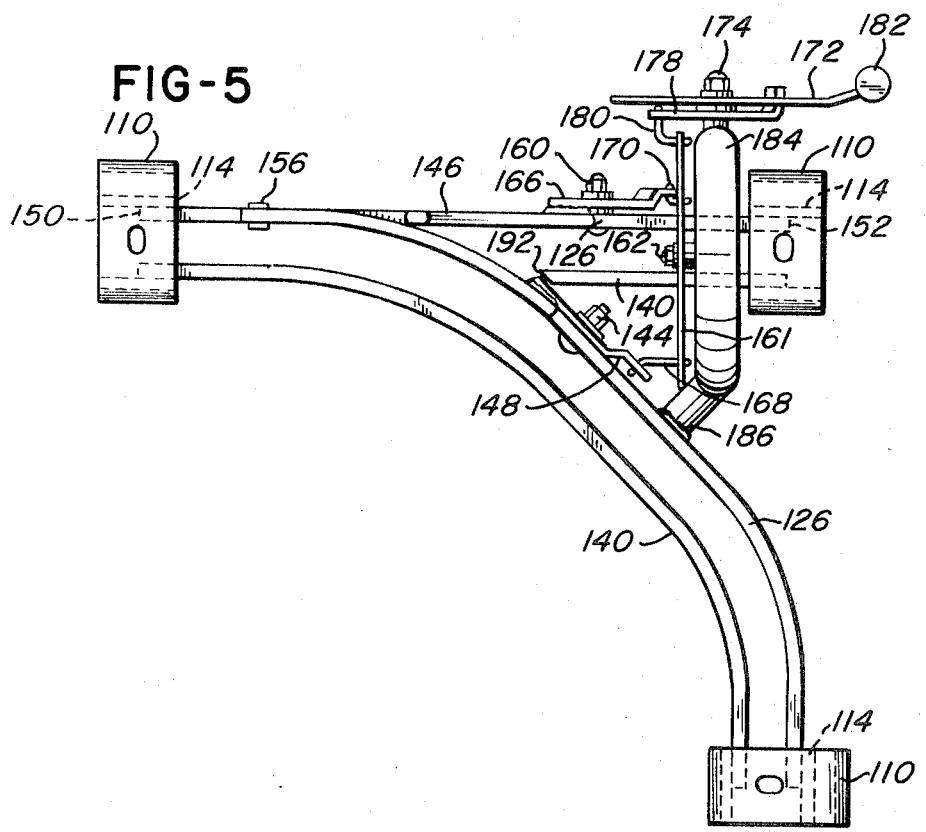

SAFETY MEANS FOR TROLLEY SWITCHES

BACKGROUND OF THE INVENTION

Overhead track systems for conveying heavy meat animals and the like, have been used extensively in meat packing plants and related establishments. The track system usually includes a number of trolleys from which rather heavy loads are suspended as the trolleys advance from one station to another along the main rails of the track system. The system usually includes also a numbear of switches whereby the trolleys may be directed onto selected sections of rails in the track system, or to selected stations at which various operations are to be performed on the suspended animals or carcasses.

On occasion, a loaded trolley may derail, usually at or near a switch, allowing the trolley and its load to drop accidentally from the track system onto a floor or operating station, thereby endangering the lives or well-being of workmen in the vicinity.

A primary object of the present invention is to prevent accidental derailment of the trolleys, and the hazards attending such derailments.

SUMMARY OF THE INVENTION

The invention involves primarily the mounting of a rigid heavy-duty guard rail or deflector means in spaced substantial parallelism with the trolley rail of conventional trolley switches, so as to limit the degree of any trolley derailment and preclude with certainty the dropping of the trolley per se and the load carried by it if derailment occurs at the switch. The guard rail may be either a straight section of steel bar stock, or a curved section, to complement the straight and curved trolley rail sections of the switch unit. In effect, the guard rail serves to limit lateral displacement of the trolley carriage relative to the trolley rail, should the grooved periphery of the trolley wheel leave the trolley rail for any reason.

The guard rail as applied to the switch unit, offers no interference with free movement of trolleys through the switch unit under normal conditions of use. Moreover, existing switch units may easily be converted, or replaced, to incorporate the present invention in existing overhead track systems.

BRIEF DESCRIPTION OF THE DRAWINGS

FIG. 1 is a perspective view of an overhead track switch unit embodying the present invention.

FIG. 2 is a top plan view of the same.

FIG. 3 is an end view taken on line 3—3 of FIG. 2.

FIG. 4 is a cross-section taken on line 4—4 of FIG. 2.

FIG. 5 is a view similar to FIG. 2, showing an alternative form of switch unit incorporating the invention.

DESCRIPTION OF THE PREFERRED EMBODIMENTS

In the drawings, the numerals 10 indicate metallic rail hangers usually bolted or otherwise secured to overhead beams such as 12, said hangers being substantially of inverted U-shaped formation, FIG. 3. Each hanger includes a pair of depending spaced legs 14 and 16, which are spaced apart at their free lower end portions 18 and 20. Leg 14 is offset or bent inwardly as shown, to provide headroom for a trolley carriage 22 embracing a peripherally grooved trolley wheel 24 that rides upon the upper edge of a track 26 bolted or otherwise secured to leg 14 and 28. The carriage includes a suspension arm 30 which depends substantially vertically alongside track 26, and carries a hook 32 or other load suspension means. The hook may engage the leg of a meat animal to be transported by the trolley carriage, by way of example.

The trolley wheel 24 has a peripheral groove 34 provided with a pair of wheel flanges 36, 36, that normally flank the track side faces along the upper edge of the track, as is usual.

With further reference to FIG. 3, the numeral 40 denotes a guard rail or deflector means in the form of an elongate steel bar, that extends in spaced parallelism with track 26 at a distance therefrom sufficient to permit free transit of carriage arm 30 between the bar 40 and track 26. Guard rail 40 is secured to hanger leg 16 in any suitable manner, as by means of welds for example, with the upper edge of the guard rail preferably about level with the upper edge of track 26.

A spacer such as 42 may be provided, if necessary, to establish a proper spacing between the trolley track and guard rail 40. Such proper spacing may be considered one which permits normal free transit of trolley arm 30, while at the same time limiting lateral displacement of the trolley relative to track 26 in the direction of guard rail or deflector means 40, in the event that the trolley wheel tends to leave track 26. Should the trolley wheel tend to leave track 26, the guard rail 40 will be engaged by trolley arm 30 to preclude derailment. Preferably, the trolley arm is spaced from the guard rail a distance less than half the width of the trolley wheel. The trolley of course cannot derail in the direction of hanger leg 14, due to the proximity of trolley arm 30 to track member 26.

The provision of a guard rail of deflector means such as 40 in a track system, is particularly desirable on sharp curves or in the environs of a trolley switch unit, where trolley derailment is most likely to occur. FIGS. 1–3 disclose a switch unit, which comprises three hangers 10 disposed in triangular relationship, the left and right hangers being rigidly connected by a curved track section 26, and the left and middle hangers being rigidly connected by a straight guard rail 40. Guard rail 40 is parallel to a straight track section 26 to which is pivoted, at 44, a movable bridge member or lift section 46. Section 46 is welded to the rocker 48, and pivot 44 passes through the rocker and track 26, to dispose the movable lift section in the plane of said track.

Lift section 46, in FIGS. 1 and 2, is shown in an inoperative elevated position, to produce a gap in track section 26. By lowering the lift section, said gap can be closed to establish continuity of track section 26, so that a trolley might be rolled along the length of section 26 between the points 50 and 52. When lowered, the lift section 46 will rest upon lift seats 54 and 56, it being noted that seat 56 will be uncovered to accommodate lift section 46 by reason of an upward displacement of a second lift section 58 about pivot 60. That is to say, the lift sections 46 and 58 will alternatively engage the seat 56, incident to rocking movements to and fro of a crosshead 61, which moves on a fixed pivot 62.

It is noted that lift section 58 is welded at 64 to a ocker 66, so that a clockwise rotation thereof about pivot 60 will elevate section 58 to make way for the seating of section 46 at 56. The lift sections operate in alternation, due to their connections with crosshead 61 by way of link members 68 and 70. The lower ends of link members 68 and 70 have pivotal connection with the rear ends of rockers 48 and 66, respectively.

The crosshead 61 may be rocked manually about pivot 62, by means of a rockable actuator bar 72, which turns on a fixed pivot 74 incident to manual reciprocation of a hand piece 76. Bar 72 carries a rigid arm 78 having a free end connected by means of a link 80, with crosshead 61. Arm 78 moves with bar 72, and bar 72 may be counterweighted at 82, if desired.

The pivots 62 and 74 may be supported upon a rigid loop bar 84 having opposite ends welded at 86 and 88, upon the flat sides of track sections 26, 26. The height of the loop bar is guaged to permit advancement of trolley 22 freely along its supporting track section and across lift section 58, whenever said lift section is lowered to the operative position shown.

As was previously pointed out, disposition of lift section 58 to an elevated inoperative position precludes advancement of trolley 22 beyond it, but at the same time, the other lift section 46 will be lowered so as to restore continuity of the track section between points 50 and 52, thereby to permit free movement of trolleys between and beyond said points. It should be understood, that additional trolley track sections are attachable to the switch unit at the locations 90, 90, 90, in order to produce a desired extensive track system. The curved guard rail 40 of FIGS. 1 and 2 is to terminate as close as possible to the straight track section 26, as at 92. The straight and curved track sections 26, 26 are convergent.

FIG. 5 discloses in plan, a modification of the switch unit incorporating certain parts reversals found desirable in constructing a track system. The elements employed in FIG. 5 are the same as in FIG. 2, with some rearrangement. Accordingly, the constituent parts in FIG. 5 may conveniently be designated with the same reference characters used in FIG. 2, with the prefix "1" added. Thus, 126 deontes the trolley tracks, and 140 denotes the parallel guard rails, all supported by the hangers 110, 110, 110 as heretofore explained. It may be noted that FIG. 5 is distinguished by the fact that the curved guard rail 140 is located inwardly of curved track 126, whereas in FIG. 2 it is located outwardly of the curved track. Similarly, in FIG. 5 the straight guard rail 140 is interior to the straight track section 126, this being a reversal of the elements in comparision with FIG. 2.

The actuating mechanism including the crosshead 161 and rockable actuator bar 172, is in FIG. 5 located outside the arc of the curved sections 140 and 126, whereas in FIG. 2 said mechanism is located inside the corresponding arc. In all other respects, and with the exceptions mentioned in the next preceding paragraph, the switch units of FIGS. 5 and 2 are substantially identical.

Trolley switches constructed in accordance with the present invention, are not only safer than others from the standpoint of preventing trolley derailment accidents, but are characterized by great durability and rigidity due to the reinforcing effect of the guard rails paralleling the trolley track sections.

What is claimed is:

1. An overhead track switch unit for tractionally supporting a wheeled trolley having a depending load supporting arm supported therefrom, comprising: convergent first and second trolley track sections each comprising a metallic bar having an upper edge to support a wheel of a trolley and having opposite side faces, said load suspending arm depending alongside and spaced from one of said side faces, a guard rail supported on the unit in spaced substantial parallelism with said one side face closely adjacent the path of advancement of said load suspending arm so as to abut and limit lateral displacement of said arm relative to the trolley supporting track section to preclude derailment of said trolley wheel from a track section engaged by the wheel, said guard rail having a free upper edge and having a side face in opposed relation to said one side face of said track section, and said load supporting arm engageable with said guard rail side face to prevent derailment of the trolley wheel.

2. An overhead track switch as in claim 1, wherein said guard rail comprises a substantially flat metallic bar having its free upper edge substantially in the plane of the upper edge of the track section, the side face of the guard rail spaced from the track section a distance less than the width of the trolley wheel supported on the track.

3. An overhead track switch unit for tractionallly supporting a wheeled trolley having a depending load supporting arm supported therefrom, comprising: convergent first and second trolley track sections each comprising a metallic bar having an upper edge to support a wheel of a trolley and having opposite side faces, said load suspending arm depending alongside and spaced from one of said side faces, a pair of separate guard rails each supported on the unit in spaced substantial parallelism with said one side face of a respective track section and closely adjacent the path of advancement of said load suspending arm so as to abut and limit lateral displacement of said arm relative to the trolley supporting track section to preclude derailment of said trolley wheel from a track section engaged by the wheel.

4. The switch unit as defined by claim 3, wherein the track sections and the guard rails are formed of flat strap metal with the flat sides thereof disposed in vertical planes.

5. An overhead track switch unit for tractionally supporting a wheeled trolley having a depending load suspending arm, said unit comprising: a group of three inverted U-shaped track hangers each having a pair of spaced substantially parallel depending legs with free ends, and means connecting said legs and providing for suspension of said hangers from overhead support means; a first curved metallic strap connecting the free ends of corresponding legs of two hangers to provide a curved track section on which the trolley wheel may ride, and a second curved metallic strap connecting the free ends of the remaining corresponding legs of said two hangers, to provide a curved guard rail in substantial parallelism with said track section; a straight track section connecting said curved track section with one leg of the third hanger; a straight guard rail supported by the remaining leg of said third hanger, to extend in spaced substantial parallelism with said straight track section, said track sections being spaced from said guard rails a distance such as to allow free transit of the trolley arm lengthwise thereof, with the trolley arm subject to abutment with a guard rail in restraint of derailment of the trolley wheel; and switch means associated with the track sections to determine the course of transit of the trolley over said track sections.

6. The switch unit as defined by claim 5, wherein the space between the depending trolley arm and a guard rail, is less than half of the width dimension of the trolley wheel.

7. The switch unit as defined by claim 5, wherein the guard rails have upper edges disposed approximately level with the wheel-supporting edges of the track sections.

8. An overhead track switch unit for tractionally supporting a wheeled trolley having a depending load suspending arm, said unit comprising: a group of three inverted U-shaped track hangers each having a pair of spaced substantially parallel depending legs with free ends, and means connecting said legs and providing for suspension of said hangers from overhead support means; a first curved metallic strap connecting the free ends of corresponding legs of two hangers to provide a curved track section on which the trolley wheel may ride, and a second curved metallic strap supported by the remaining leg of one of said two hangers, to provide a curved guard rail in spaced substantial parallelism with said track section; a straight metallic strap providing a straight guard rail connecting a remaining leg of one of said two hangers with a corresponding leg of the third hangers; a straight metallic strap supported by the remaining leg of said third hanger, to extend in spaced substantial parallelism with the straight guard rail aforesaid, said track sections being spaced from said guard rails a distance such as to allow free transit of the trolley arm lengthwise thereof, with the trolley arm subject to abutment with a guard rail in restraint of derailment of the trolley wheel; and switch means associated with the track sections to guide the trolley over said track sections.

9. The switch unit as defined by claim 8, wherein the guard rails have upper edges disposed approximately level with the wheel-supporting edges of the track sections.

10. The switch unit as defined by claim 8, wherein the space between the depending trolley arm and a guard rail, is less than half of the width dimension of the trolley wheel.

* * * * *